US012381691B2

(12) United States Patent
Liu et al.

(10) Patent No.: US 12,381,691 B2
(45) Date of Patent: Aug. 5, 2025

(54) NETWORK CODING USING FEEDBACK ASSOCIATED WITH FEEDBACK BINS

(71) Applicant: QUALCOMM Incorporated, San Diego, CA (US)

(72) Inventors: Guangyi Liu, San Diego, CA (US); Tien Viet Nguyen, Bridgewater, NJ (US); Gabi Sarkis, San Diego, CA (US); Gene Wesley Marsh, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 17/456,794

(22) Filed: Nov. 29, 2021

(65) Prior Publication Data

US 2023/0171069 A1 Jun. 1, 2023

(51) Int. Cl.
*H04L 5/00* (2006.01)
*H04W 4/02* (2018.01)
*H04W 72/20* (2023.01)

(52) U.S. Cl.
CPC ........... *H04L 5/0055* (2013.01); *H04W 4/023* (2013.01); *H04W 72/20* (2023.01)

(58) Field of Classification Search
CPC ........... H04L 5/0055; H04L 2001/0093; H04L 1/1819; H04L 2001/0092; H04L 1/1854; H04W 4/023; H04W 72/20
USPC ......................................................... 370/329
See application file for complete search history.

(56) References Cited

U.S. PATENT DOCUMENTS

| 2020/0396040 A1 | 12/2020 | Miao |
| 2021/0112445 A1 | 4/2021 | Wu et al. |
| 2021/0297988 A1 * | 9/2021 | Zhou ............... H04L 1/1819 |

FOREIGN PATENT DOCUMENTS

| CN | 101964703 A | * | 2/2011 | |
| CN | 102355341 A | * | 2/2012 | |
| CN | 104219030 A | * | 12/2014 | ........... H04L 1/0076 |
| CN | 104639292 A | * | 5/2015 | |

(Continued)

OTHER PUBLICATIONS

International Search Report and Written Opinion—PCT/US2022/078373—ISA/EPO—Jan. 23, 2023.

(Continued)

*Primary Examiner* — Khaled M Kassim
*Assistant Examiner* — Oladiran Gideon Olaleye
(74) *Attorney, Agent, or Firm* — Harrity & Harrity, LLP

(57) ABSTRACT

Various aspects of the present disclosure generally relate to wireless communication. In some aspects, a mobile station may transmit, from the mobile station to an encoding device, acknowledgement or negative acknowledgement (ACK-NACK) feedback based at least in part on a transmission by the encoding device, wherein the ACK-NACK feedback is associated with a feedback bin, and wherein the feedback bin is associated with a location of the mobile station. The mobile station may receive, at the mobile station from the encoding device, a network coding transport block, wherein the network coding transport block is formed based at least in part on the transmission and the ACK-NACK feedback associated with the feedback bin. Numerous other aspects are described.

30 Claims, 10 Drawing Sheets

(56) References Cited

FOREIGN PATENT DOCUMENTS

| CN | 102547587 B | * | 7/2015 | |
|----|-------------|---|--------|---|
| CN | 107769887 A | * | 3/2018 | ............... H04L 1/00 |
| CN | 110838897 A | * | 2/2020 | ........... H04L 1/1812 |
| KR | 2019135838 A | * | 12/2019 | ........... H04L 1/0047 |
| WO | WO-2020144261 A1 | | 7/2020 | |
| WO | WO-2020184955 A1 | * | 9/2020 | ........... H04L 1/1812 |
| WO | WO-2020206319 A1 | * | 10/2020 | ........... H04L 1/1861 |
| WO | WO-2020222568 A1 | * | 11/2020 | ........... H04L 1/1607 |
| WO | WO-2021051218 A1 | | 3/2021 | |
| WO | WO-2021083260 A1 | | 5/2021 | |

OTHER PUBLICATIONS

Qualcomm Incorporated: "Remaining MAC Issues", 3GPP TSG RAN WG2 #110-e, R2-2005575, 3rd Generation Partnership Project, Mobile Competence Centre, 650, Route Des Lucioles, F-06921 Sophia-Antipolis Cedex, France, vol. RAN WG2, No. E-meeting, Jun. 8, 2020-Jun. 12, 2020, May 22, 2020, XP051888900, p. 2-p. 3, p. 6, and p. 8.

* cited by examiner

NETWORK CODING USING FEEDBACK ASSOCIATED WITH FEEDBACK BINS

FIELD OF THE DISCLOSURE

Aspects of the present disclosure generally relate to wireless communication and to techniques and apparatuses for network coding using feedback associated with feedback bins.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a mobile station includes a memory and one or more processors, coupled to the memory, configured to, based at least in part on information stored in the memory: transmit, from the mobile station to an encoding device, acknowledgement or negative acknowledgement (ACK-NACK) feedback based at least in part on a transmission by the encoding device, wherein the ACK-NACK feedback is associated with a feedback bin, and wherein the feedback bin is associated with a location of the mobile station; and receive, at the mobile station from the encoding device, a network coding transport block, wherein the network coding transport block is formed based at least in part on the transmission and the ACK-NACK feedback associated with the feedback bin.

In some implementations, an apparatus for wireless communication at an encoding device includes a memory and one or more processors, coupled to the memory, configured to, based at least in part on information stored in the memory: receive, at the encoding device from a mobile station, ACK-NACK feedback based at least in part on a transmission by the encoding device, wherein the ACK-NACK feedback is associated with a feedback bin, and wherein the feedback bin is associated with a location of the mobile station; and transmit, from the encoding device to the mobile station, a network coding transport block, wherein the network coding transport block is formed based at least in part on the transmission and the ACK-NACK feedback associated with the feedback bin.

In some implementations, a method of wireless communication performed by a mobile station includes transmitting, from the mobile station to an encoding device, ACK-NACK feedback based at least in part on a transmission by the encoding device, wherein the ACK-NACK feedback is associated with a feedback bin, and wherein the feedback bin is associated with a location of the mobile station; and receiving, at the mobile station from the encoding device, a network coding transport block, wherein the network coding transport block is formed based at least in part on the transmission and the ACK-NACK feedback associated with the feedback bin.

In some implementations, a method of wireless communication performed by an encoding device includes receiving, at the encoding device from a mobile station, ACK-NACK feedback based at least in part on a transmission by the encoding device, wherein the ACK-NACK feedback is associated with a feedback bin, and wherein the feedback bin is associated with a location of the mobile station; and transmitting, from the encoding device to the mobile station, a network coding transport block, wherein the network coding transport block is formed based at least in part on the transmission and the ACK-NACK feedback associated with the feedback bin.

In some implementations, a non-transitory computer-readable medium storing a set of instructions for wireless communication includes one or more instructions that, when executed by one or more processors of a mobile station, cause the mobile station to: transmit, from the mobile station to an encoding device, ACK-NACK feedback based at least in part on a transmission by the encoding device, wherein the ACK-NACK feedback is associated with a feedback bin, and wherein the feedback bin is associated with a location of the mobile station; and receive, at the mobile station from the encoding device, a network coding transport block, wherein the network coding transport block is formed based at least in part on the transmission and the ACK-NACK feedback associated with the feedback bin.

In some implementations, a non-transitory computer-readable medium storing a set of instructions for wireless communication includes one or more instructions that, when executed by one or more processors of an encoding device, cause the encoding device to: receive, at the encoding device from a mobile station, ACK-NACK feedback based at least in part on a transmission by the encoding device, wherein the ACK-NACK feedback is associated with a feedback bin, and wherein the feedback bin is associated with a location of the mobile station; and transmit, from the encoding device to the mobile station, a network coding transport block, wherein the network coding transport block is formed based at least in part on the transmission and the ACK-NACK feedback associated with the feedback bin.

In some implementations, an apparatus for wireless communication includes means for transmitting, from the apparatus to an encoding device, ACK-NACK feedback based at least in part on a transmission by the encoding device, wherein the ACK-NACK feedback is associated with a feedback bin, and wherein the feedback bin is associated with a location of the apparatus; and means for receiving, at the apparatus from the encoding device, a network coding transport block, wherein the network coding transport block is formed based at least in part on the transmission and the ACK-NACK feedback associated with the feedback bin.

In some implementations, an apparatus for wireless communication includes means for receiving, at the apparatus from a mobile station, ACK-NACK feedback based at least in part on a transmission by the apparatus, wherein the ACK-NACK feedback is associated with a feedback bin, and wherein the feedback bin is associated with a location of the mobile station; and means for transmitting, from the apparatus to the mobile station, a network coding transport block, wherein the network coding transport block is formed based at least in part on the transmission and the ACK-NACK feedback associated with the feedback bin.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
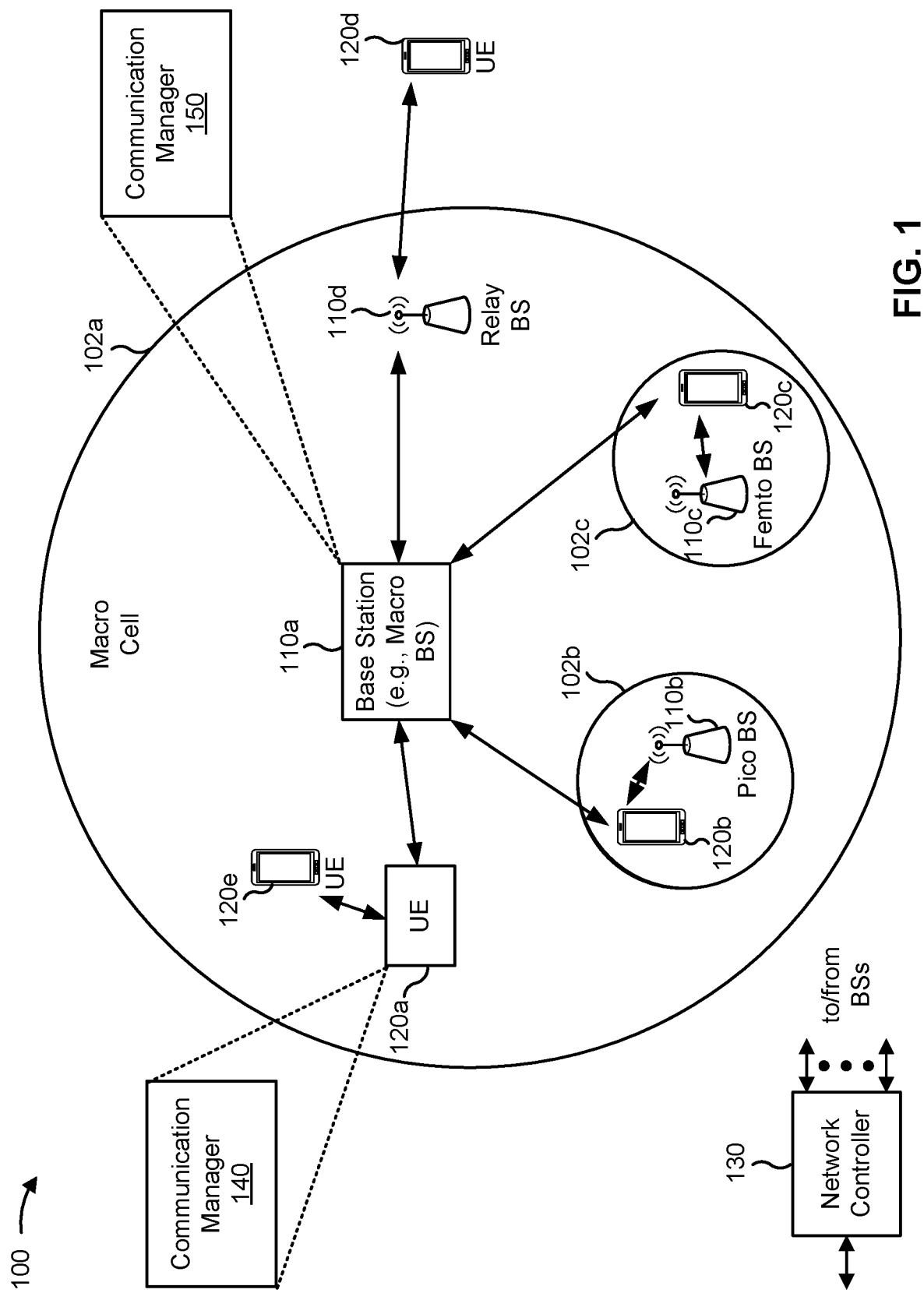
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a mobile station (e.g., UE 120) may include a communication manager 140. As described in more detail elsewhere herein, the communication manager 140 may transmit, from the mobile station to an encoding device, acknowledgement or negative acknowledgement (ACK-NACK) feedback based at least in part on a transmission by the encoding device, wherein the ACK-NACK feedback is associated with a feedback bin, and wherein the feedback bin is associated with a location of the mobile station; and receive, at the mobile station from the encoding device, a network coding transport block, wherein the network coding transport block is formed based at least in part on the transmission and the ACK-NACK feedback associated with the feedback bin. Additionally, or alternatively, the communication manager 140 may perform one or more other operations described herein.

In some aspects, an encoding device (e.g., base station 110) may include a communication manager 150. As described in more detail elsewhere herein, the communication manager 150 may receive, at the encoding device from a mobile station, ACK-NACK feedback based at least in part on a transmission by the encoding device, wherein the ACK-NACK feedback is associated with a feedback bin, and wherein the feedback bin is associated with a location of the mobile station; and transmit, from the encoding device to the mobile station, a network coding transport block, wherein the network coding transport block is formed based at least in part on the transmission and the ACK-NACK feedback associated with the feedback bin. Additionally, or alternatively, the communication manager 150 may perform one or more other operations described herein.

As indicated above, FIG. 1 is provided as an example. Other examples may differ from what is described with regard to FIG. 1.

Figure 2:
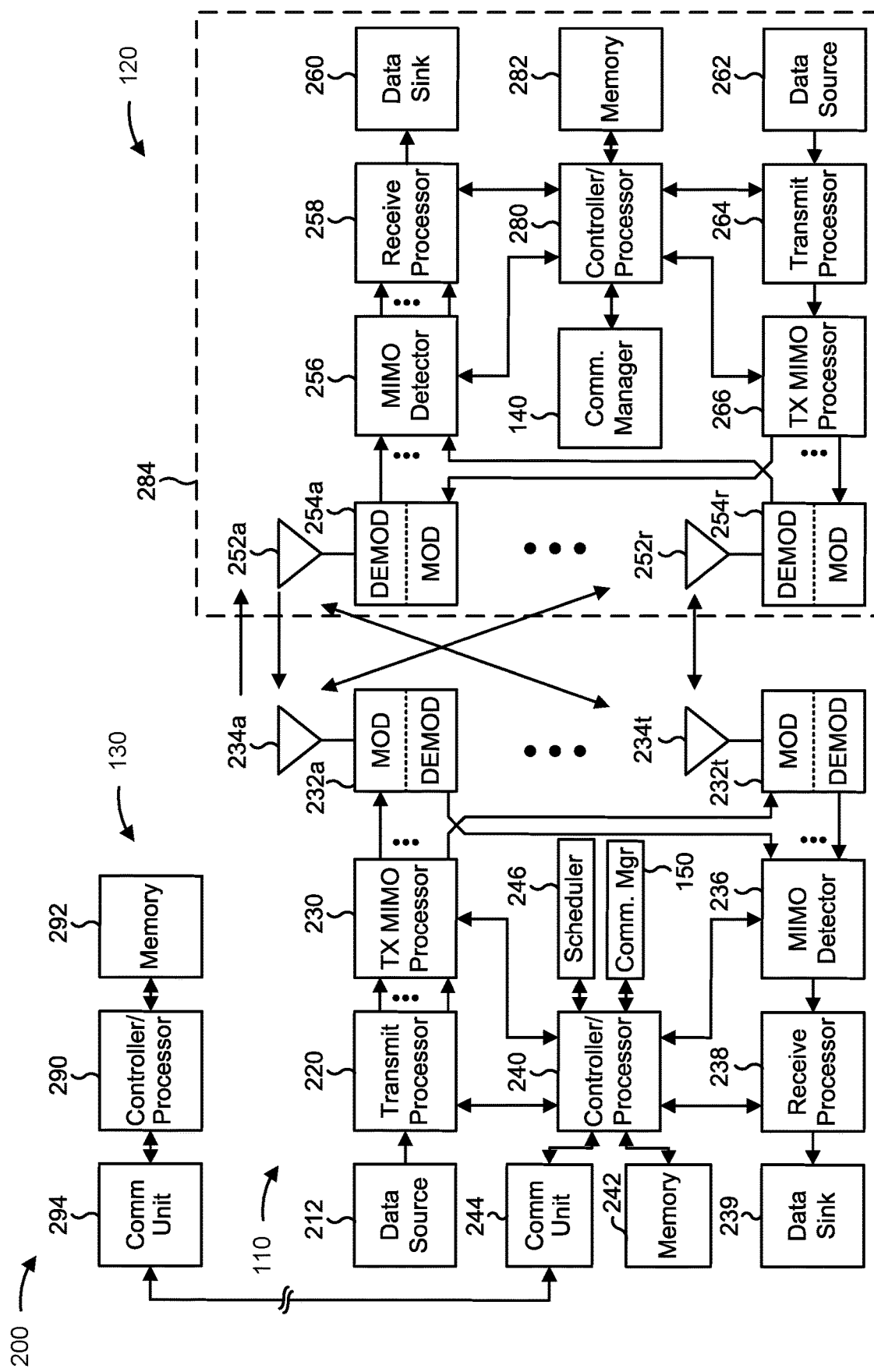
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more techniques associated with network coding using feedback associated with feedback bins, as described in more detail elsewhere herein. In some aspects, the encoding device described herein is the base station 110, is included in the base station 110, or includes one or more components of the base station 110 shown in FIG. 2. In some aspects, the encoding device described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a mobile station (e.g., UE 120) includes means for transmitting, from the mobile station to an encoding device, ACK-NACK feedback based at least in part on a transmission by the encoding device, wherein the ACK-NACK feedback is associated with a feedback bin, and wherein the feedback bin is associated with a location of the mobile station; and/or means for receiving, at the mobile station from the encoding device, a network coding transport block, wherein the network coding transport block is formed based at least in part on the transmission and the ACK-NACK feedback associated with the feedback bin. In some aspects, the means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an encoding device (e.g., base station 110) includes means for receiving, at the encoding device from a mobile station, ACK-NACK feedback based at least in part on a transmission by the encoding device, wherein the ACK-NACK feedback is associated with a feedback bin, and wherein the feedback bin is associated with a location of the mobile station; and/or means for transmitting, from the encoding device to the mobile station, a network coding transport block, wherein the network coding transport block is formed based at least in part on the transmission and the ACK-NACK feedback associated with the feedback bin. In some aspects, the means for the encoding device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Network coding may be used to increase a system capacity and to improve resource utilization. Network coding may reduce a quantity of retransmissions in the system without degrading a system performance. Network coding may enable an increase to a quantity of UEs in a region, and/or may enable an increase in traffic per UE in the region. After an initial transmission, retransmissions by an original transmitter may be replaced by network coding, which may reduce the quantity of retransmissions.

Figure 3:
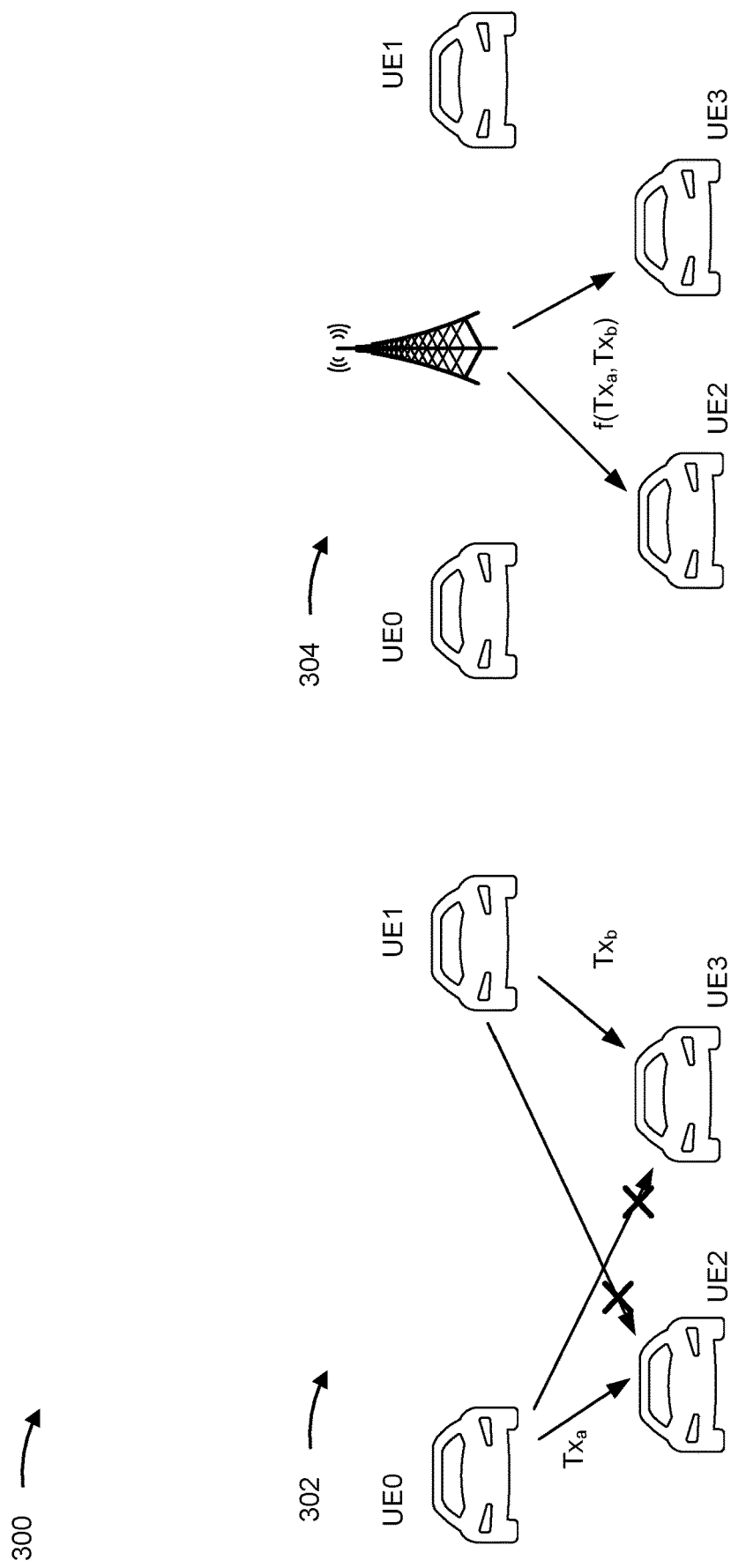
FIG. 3 is a diagram illustrating an example of network coding, in accordance with the present disclosure.

FIG. 3 is a diagram illustrating an example 300 of network coding, in accordance with the present disclosure.

As shown by reference number 302, a first UE (UE0) may transmit a first transmission ($Tx_a$) to a third UE (UE2) and a fourth UE (UE3). A second UE (UE1) may transmit a second transmission ($Tx_b$) to the third UE and the fourth UE. The third UE may not receive the second transmission from the second UE, and the fourth UE may not receive the first transmission from the first UE. The first UE may retransmit the first transmission to the fourth UE, and the second UE may retransmit the second transmission to the third UE. In this case, a total of two retransmissions may be needed when network coding is not used.

As shown by reference number 304, the third UE may not receive the second transmission from the second UE, and the fourth UE may not receive the first transmission from the first UE. An encoding device, such as a base station (e.g., gNB), a roadside unit (RSU), or a UE, may combine the first transmission and the second transmission to form a single network coding packet. The encoding device may be a network coding encoding device. The network coding packet may be a function of the first transmission and the second transmission. In other words, the network coding packet may be based at least in part on $f(Tx_a, Tx_b)$, where $f$ is a function. The encoding device may transmit the network coding packet, which may be received at the third UE and the fourth UE. The third UE may obtain the second transmission from the network coding packet, which was previously not received at the third UE. The fourth UE may obtain the first transmission from the network coding packet, which was previously not received at the fourth UE. In this case, only a single retransmission may be needed when network coding is used.

As indicated above, FIG. 3 is provided as an example. Other examples may differ from what is described with regard to FIG. 3.

Figure 4:
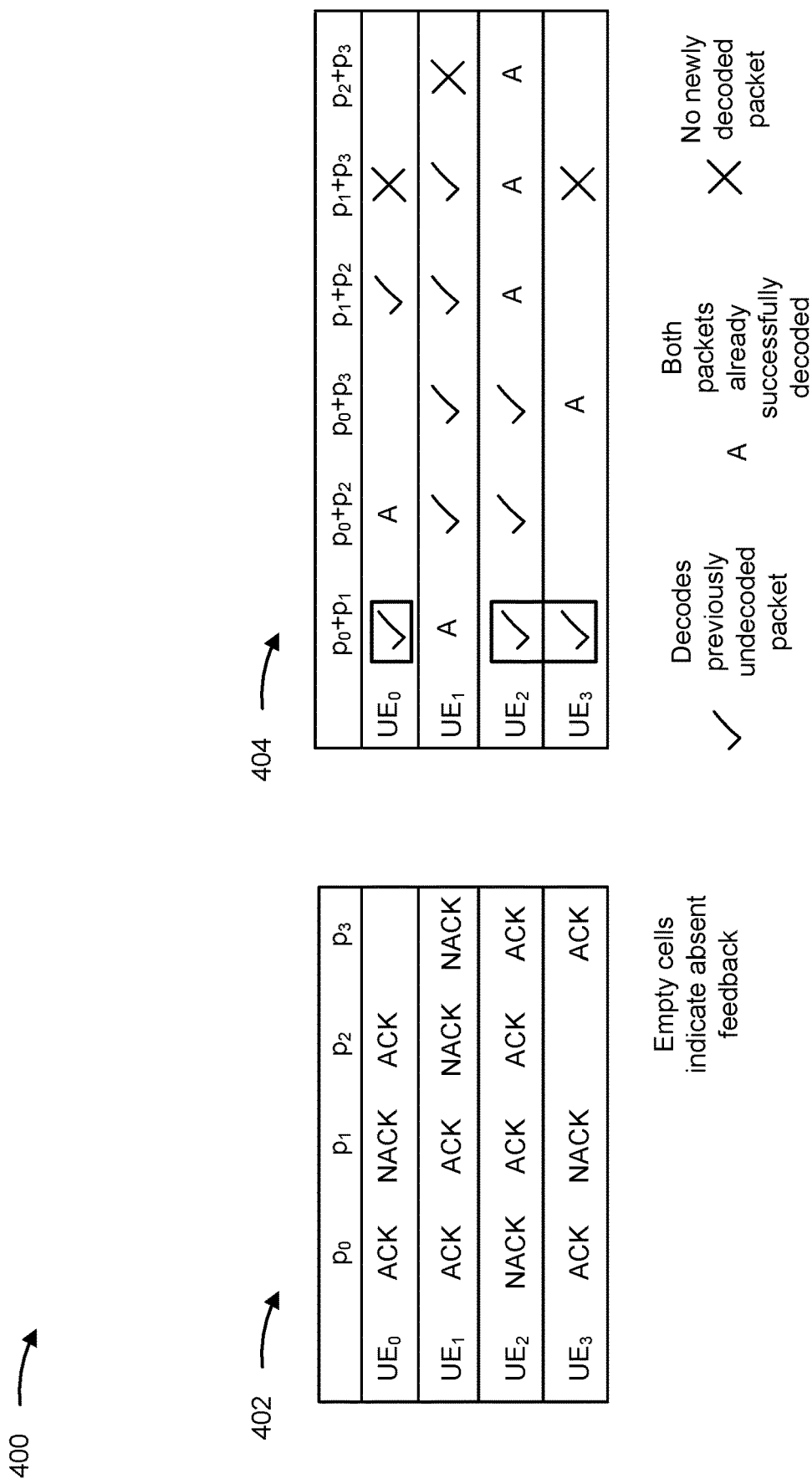
FIG. 4 is a diagram illustrating an example of network coding based at least in part on feedback, in accordance with the present disclosure.

FIG. 4 is a diagram illustrating an example 400 of network coding based at least in part on feedback, in accordance with the present disclosure.

As shown by reference number 402, an encoding device may receive feedback from a plurality of UEs (e.g., $UE_0$, $UE_1$, $UE_2$, and $UE_3$), where the feedback may indicate whether a packet (e.g., $P_0$, $P_1$, $P_2$, or $P_3$) has been successfully received or not. The feedback may indicate an acknowledgement (ACK) when the packet has been successfully received, or the feedback may indicate a negative acknowledgement (NACK) when the packet has not been successfully received. The encoding device may maintain indications of feedback for the plurality of UEs. The encoding device may determine, based at least in part on the feedback, which UE of the plurality of UEs has which packet in a buffer of the UE. Each UE may transmit, to the encoding device, the feedback (e.g., ACK) indicating that the UE has received the packet or the feedback (e.g., NACK) indicating that the UE has not received the packet.

In this example, a first UE ($UE_0$) may indicate an ACK for a first packet ($P_0$), a NACK for a second packet ($P_1$), an ACK for a third packet ($P_2$), and no feedback for a fourth packet ($P_3$). A second UE ($UE_1$) may indicate an ACK for the first packet, an ACK for the second packet, a NACK for the third packet, and a NACK for the fourth packet. A third UE ($UE_2$) may indicate a NACK for the first packet, an ACK for the second packet, an ACK for the third packet, and an ACK for the fourth packet. A fourth UE ($UE_3$) may indicate an ACK for the first packet, a NACK for the second packet, no feedback for the third packet, and an ACK for the fourth packet.

The encoding device may assume an ACK for a packet of a source UE. For example, the encoding device may assume an ACK for the first packet associated with the first UE. The encoding device may assume an ACK for the second packet associated with the second UE. The encoding device may assume an ACK for the third packet associated with the third UE. The encoding device may assume an ACK for the fourth packet associated with the fourth UE.

The encoding device may combine some of the packets to form a network coding packet. The network coding packet may be an encoded transport block (TB). For example, the encoding device may combine $P_0$ and $P_1$ to form the network coding packet. The encoding device may combine $P_0$ and $P_2$ to form the network coding packet. The encoding device may combine $P_0$ and $P_3$ to form the network coding packet. The encoding device may combine $P_1$ and $P_2$ to form the network coding packet. The encoding device may combine $P_1$ and $P_3$ to form the network coding packet. The encoding device may combine $P_2$ and $P_3$ to form the network coding packet. The encoding device may select particular packets for which to perform network coding to maximize a quantity of NACK-to-ACK flips. In other words, the encoding device may attempt to maximize the quantity of UEs that are able to decode previously undecoded packets due to the network coding (e.g., flipping NACKs to ACKs).

As shown by reference number 404, when the encoding device forms a network coding packet by combining $P_0$ and $P_1$, the first UE, the third UE, and the fourth UE may be able to decode a previously undecoded packet. For example, the first UE may be able to decode $P_1$, which was previously associated with a NACK. The third UE may be able to decode $P_0$, which was previously associated with a NACK. The fourth UE may be able to decode $P_1$, which was previously associated with a NACK. In this case, transmitting the network coding packet that combines $P_0$ and $P_1$ enables three UEs to decode a previously undecoded packet. Alternatively, when the encoding device forms a network coding packet by combining $P_0$ and $P_2$, or $P_0$ and $P_3$, or $P_1$ and $P_2$, only two UEs may decode a previously undecoded packet. When the encoding device forms a network combing packet by combining $P_1$ and $P_3$, only one UE may decode a previously undecoded packet. When the encoding device forms a network combing packet by combining P2 and $P_3$, no UEs may decode a previously undecoded packet. In some cases, the network coding packet may be formed by two packets that are already successfully decoded, or the network coding packet may result in no newly decoded packets.

As indicated above, FIG. 4 is provided as an example. Other examples may differ from what is described with regard to FIG. 4.

Network coding may involve combining two or more packets. In some cases, network coding may combine up to four packets. However, an amount of feedback resources needed for transmitting feedback from UEs to enable the network coding may be relatively large. For example, in a system with approximately 250 UEs, network coding packets may be needed for approximately 120 UEs of the 250 UEs. In this example, a network coding device may need up to 480 feedback resources (e.g., based at least in part on the 120 UEs and the four packets) to receive the feedback from each of the UEs for every packet in a combination, which may not be possible without compression, and/or a reduction in the quantity of UEs and/or the quantity of packets that are able to be combined.

In various aspects of techniques and apparatuses described herein, a UE (used interchangeably with "mobile station" herein) may transmit, to an encoding device (e.g., a base station, an RSU, or another UE), ACK-NACK feedback based at least in part on a transmission by the encoding device. The ACK-NACK feedback may be associated with a feedback bin. The feedback bin may be associated with a location of the UE. The UE may be included in a plurality of UEs that are physically located within a defined distance from the location of the UE, and the plurality of UEs may be categorized into the feedback bin. The UE may receive, from the encoding device, a network coding transport block. The network coding transport block may be formed based at least in part on the transmission and the ACK-NACK feedback associated with the feedback bin. In some aspects, the UE may transmit the ACK-NACK feedback using a physical sidelink feedback channel (PSFCH) resource associated with the feedback bin, where the PSFCH resource may be shared by the plurality of UEs associated with the feedback bin. As a result, a quantity of resources needed to provide the ACK-NACK feedback to the encoding device for network coding may be reduced, based at least in part by using the feedback bin associated with the location of the UE. Further, the UE may transmit the ACK-NACK feedback by exploiting spatial correlations, which may reduce a size associated with the ACK-NACK feedback.

In some aspects, the UE may transmit, to the encoding device, the ACK-NACK feedback using the PSFCH resource associated with the feedback bin, where the PSFCH may be shared by the plurality of UEs associated with the feedback bin. The feedback bin may be based on a UE category or location, and the feedback bin may include the plurality of UEs that are physically located close to each other (e.g., within a defined range from each other). The UE may determine the feedback bin and/or may receive an indication of the feedback bin from the encoding device. The encoding device may perform network coding based at least in part on the feedback bin. In other words, the encoding device may perform network coding based at least in part on different feedback bins of UEs.

In some aspects, the UE may obtain information regarding a location or relative position of the UE to the encoding device using global positioning system (GPS) signaling, wireless positioning, and/or information sharing. The quantity of resources needed to provide feedback from UEs to the encoding device may be reduced based at least in part on UE location information.

Figure 5:
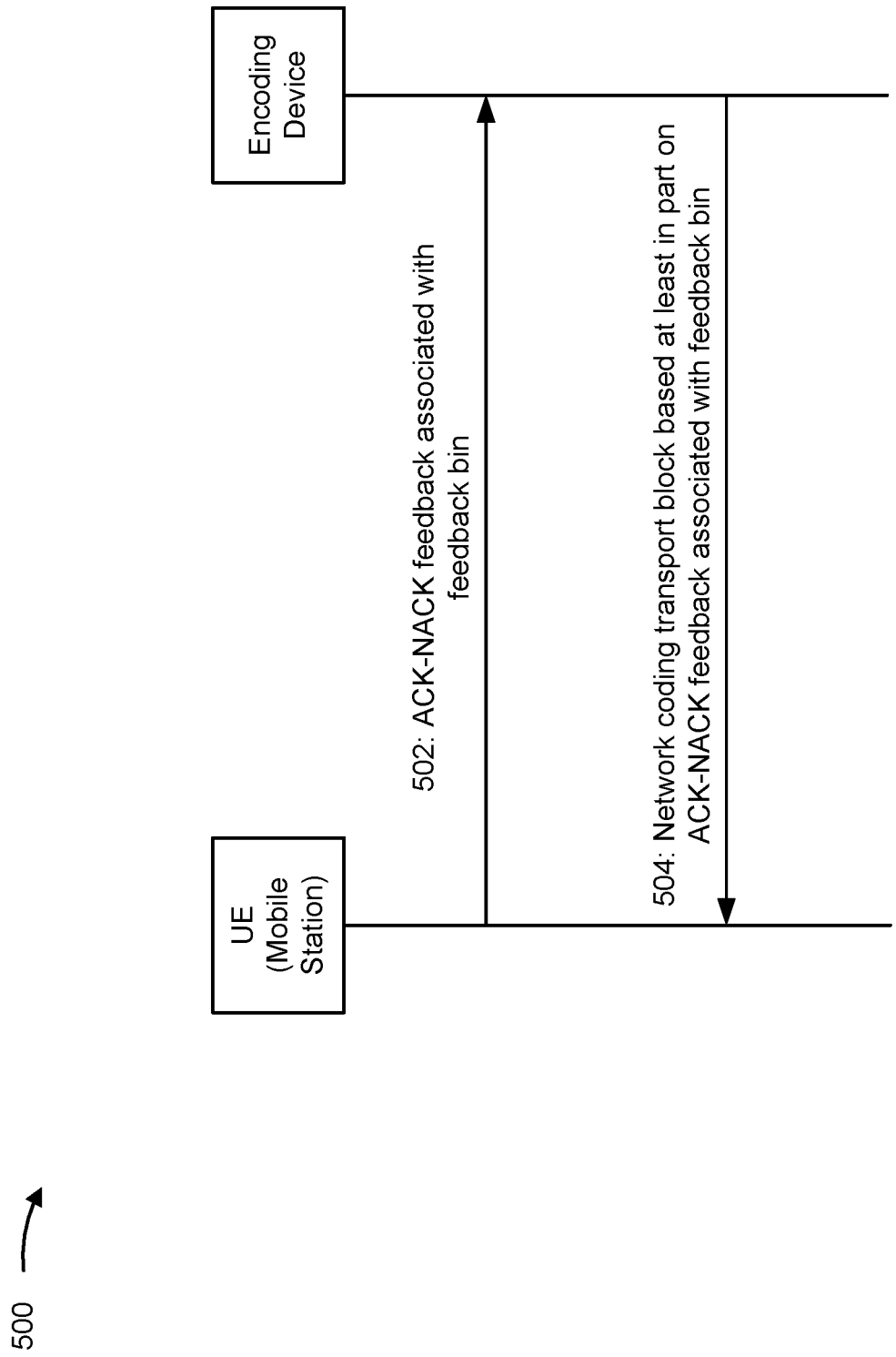
FIG. 5 is a diagram illustrating an example associated with network coding using feedback associated with feedback bins, in accordance with the present disclosure.

FIG. 5 is a diagram illustrating an example 500 associated with network coding using feedback associated with feedback bins, in accordance with the present disclosure. As shown in FIG. 5, example 500 includes communication between a UE (e.g., UE 120) and a base station (e.g., base station 110). In some aspects, the UE and the base station may be included in a wireless network, such as wireless network 100. "UE" and "mobile station" may be used interchangeably herein.

As shown by reference number 502, the UE may transmit, to the encoding device (e.g., a network coding encoding device, such as a base station, an RSU, or another UE), ACK-NACK feedback based at least in part on a transmission by the encoding device. The encoding device may perform the transmission, and the UE may transmit the ACK-NACK feedback based at least in part on the transmission. The ACK-NACK feedback may be associated with a feedback bin. The feedback bin may be associated with a location of the UE. The UE may be included in a plurality of UEs that are physically located within a defined distance from each other, and are categorized into the feedback bin.

In some aspects, the UE may transmit the ACK-NACK feedback using a PSFCH resource associated with the feedback bin. The PSFCH resource may be shared by a plurality of UEs associated with the feedback bin. The PSFCH resource may be associated with a resource block location and a PSFCH sequence cyclic shift. In some aspects, the UE may receive, from the encoding device, an indication of the PSFCH resource for transmitting the ACK-NACK feedback. In some aspects, an index associated with the PSFCH resource may be based at least in part on a zone identifier associated with the UE, where the zone identifier may be associated with the feedback bin.

In some aspects, the UE may transmit, to the encoding device, the ACK/NACK feedback for each transmission or packet (or each TB) in a manner that reduces feedback for network coding and exploits spatial correlations. UEs that are physically located within a defined distance from each other may be categorized into one subset of UEs (or one feedback bin of UEs), as these UEs may be correlated in terms of succeeding in decoding network coding packets. These UEs that are physically located relatively close to each other may be associated with similar channel conditions, such that these UEs may be similar in terms of succeeding or not succeeding in decoding network coding packets. These UEs may be binned together to form the subset of UEs, and these UEs may use a same PSFCH resource to transmit the feedback. A PSFCH resource may be associated with the resource block location and the PSFCH sequence cyclic shift.

In some aspects, the encoding device may determine the PSFCH resource, and the encoding device may transmit the indication of the PSFCH resource to the UE. In some aspects, the index for the PSFCH resource may be determined based at least in part on a zone identifier and a packet identifier (or an identifier associated with the transmission). The zone identifier may be associated with a zone (or geographic region) associated with the UE. The index for the PSFCH resource may be based at least in part on a pre-configuration.

In some aspects, feedback from the plurality of UEs (e.g., all UEs) associated with a same feedback bin may be counted based at least in part on system frame numbers (SFNs). When the encoding device detects a NACK, at least one UE in the feedback bin does not receive the packet. When the encoding device detects an ACK, at least one UE in the feedback bin receives the packet. The encoding device may consider the received feedback as coming from a single UE, such as a representing UE. When the representing UE transmits an ACK and a NACK at a same time, the encoding device may assume that the representing UE transmits a NACK.

In some aspects, UEs may be categorized into different bins (or subsets) based at least in part on UE locations. The UE may compute a feedback bin associated with the UE. For example, UEs every m meters on a road may be categorized in one feedback bin, where the categorization may be uniform in distance, and where m may be (pre-)configured or may be signaled by the encoding device.

In some aspects, the UE may receive, from the encoding device, location information associated with the encoding device. The UE may determine the feedback bin associated with the UE based at least in part on the location information associated with the encoding device. The location information associated with the encoding device may indicate a longitude and a latitude associated with the encoding device. The location information associated with the encoding device may be received from the encoding device via a sidelink control information stage 2 (SCI-2) in a network coding header, a medium access control control element (MAC-CE), or a radio resource control (RRC) message. In some aspects, the UE may receive, from the encoding device, an indication of the feedback bin associated with the UE.

In some aspects, the encoding device may indicate longitude/latitude location information associated with the encoding device via the SCI-2 in the network coding header, the MAC-CE, or a PC5 RRC message, such that the UE may compute a distance from the UE to the encoding device. The UE may determine the feedback bin associated with the UE based at least in part on the distance to the encoding device.

In some aspects, the encoding device may compute the feedback bin (or UE category) associated with the UE, and the encoding device may indicate the feedback bin to the UE. For example, UEs in adjacent zones may share a same feedback bin, but a quantity of zones that share the same feedback bin may be different between an area relatively close to the encoding device and an area relatively far from the encoding device. In other words, a categorization may be non-uniform in distance.

In some aspects, the UE may determine a zone identifier associated with the UE based at least in part on a sidelink zone length indicated in a sidelink zone configuration, a geodesic distance in longitude between the location of the mobile station and a location associated with a set of geographical coordinates, a geodesic distance in latitude between the location of the mobile station and the location associated with the set of geographical coordinates, and/or a location of the encoding device. The UE may transmit, to the encoding device, an indication of the zone identifier associated with the UE. The UE may receive, from the encoding device, an indication of the feedback bin associated with the UE, where the feedback bin associated with the UE may be based at least in part on the zone identifier associated with the UE. In some aspects, the UE may transmit the indication of the zone identifier associated with the UE in a transport block header or using a MAC-CE. In some aspects, the UE may receive the indication of the feedback bin associated with the UE via a unicast message or a multicast message.

In some aspects, the UE may compute the zone identifier associated with the UE. The UE may report the zone identifier to the encoding device. The UE may compute the zone identifier based at least in part on $x_1$=Floor (x/L) Mod 64 and $y_1$=Floor (y/L) Mod 64, where the zone identifier is based at least in part on Zone_id=y1*64+x1. In some aspects, L is a value of a sidelink zone length (sl-Zone-Length) included in a sidelink zone configuration (sl-ZoneConfig), x is a geodesic distance in longitude between the UE's current location and geographical coordinates (0, 0) according to a World Geodetic System 84 (WGS84) model (expressed in meters), y is a geodesic distance in latitude between the UE's current location and geographical coordinates (0, 0) according to the WGS84 model (expressed in meters).

In some aspects, the zone identifier may be indicated in the packet header when the UE indicates that the encoding device is to perform retransmissions. In some aspects, the zone identifier may be reported from the UE to the encoding device using a MAC-CE or other signaling.

In some aspects, the encoding device may determine that a zone uses a particular feedback bin based at least in part on a zone identifier from nearby UEs (e.g., UEs within a defined distance from the encoding device). The encoding device may indicate, to the UE, the feedback bin associated with the UE using a unicast message or a multicast message, where mappings between the zone identifier and a feedback bin identifier may be indicated in the multicast message.

In some aspects, rather than defining the zone identifier using the UE's current location and the geographical coordinates (0, 0) according to the WGS84 model, the zone identifier may be based at least in part on a location of the encoding device. In this case, the encoding device may indicate longitude/latitude location information associated with the encoding device via SCI-2 in a network coding header, a MAC-CE, or a PC5 RRC message, such that the UE may compute a distance from the UE to the encoding device. The UE may determine the feedback bin associated with the UE based at least in part on the distance to the encoding device.

As shown by reference number 504, the UE may receive, from the encoding device, a network coding transport block. The network coding transport block may be formed based at least in part on the transmission and the ACK-NACK feedback associated with the feedback bin. In other words, the encoding device may perform network coding based at least in part on the transmission and the ACK-NACK feedback associated with the feedback bin, where the ACK-NACK feedback may be associated with the feedback bin, and where the feedback bin corresponds to a particular geographic location.

In some aspects, the encoding device may form the network coding transport block by combining transmissions, where the transmissions may be associated with the ACK-NACK feedback. For example, the encoding device may transmit the network coding transport block based at least in part on a NACK feedback, and the network coding transport block may enable the UE to decode a previously undecoded transmission.

As indicated above, FIG. 5 is provided as an example. Other examples may differ from what is described with regard to FIG. 5.

Figure 6:
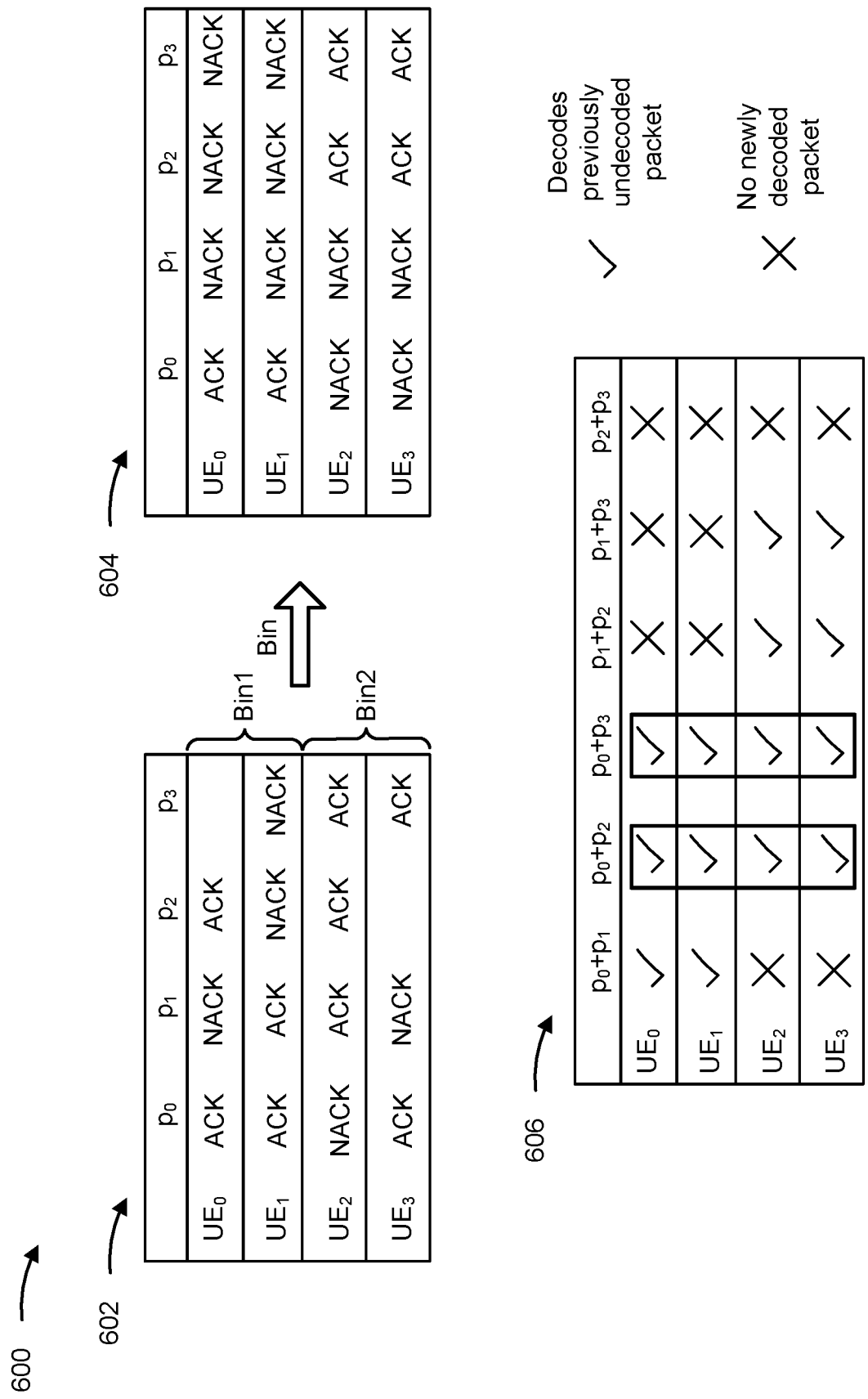
FIG. 6 is a diagram illustrating an example associated with network coding based at least in part on feedback bins, in accordance with the present disclosure.

FIG. 6 is a diagram illustrating an example 600 associated with network coding based at least in part on feedback bins, in accordance with the present disclosure.

As shown by reference number 602, an encoding device may receive feedback from a plurality of UEs (e.g., $UE_0$, $UE_1$, $UE_2$, and $UE_3$), where the feedback may indicate whether a packet (e.g., $P_0$, $P_1$, $P_2$, or $P_3$) has been successfully received or not. The feedback may indicate an ACK or a NACK. In this example, a first UE ($UE_0$) may indicate an ACK for a first packet ($P_0$), a NACK for a second packet ($P_1$), an ACK for a third packet ($P_2$), and no feedback for a fourth packet ($P_3$). A second UE ($UE_1$) may indicate an ACK for the first packet, an ACK for the second packet, a NACK for the third packet, and a NACK for the fourth packet. A third UE ($UE_2$) may indicate a NACK for the first packet, an ACK for the second packet, an ACK for the third packet, and an ACK for the fourth packet. A fourth UE ($UE_3$) may indicate an ACK for the first packet, a NACK for the second packet, no feedback for the third packet, and an ACK for the fourth packet.

As shown by reference number 604, the encoding device may employ feedback binning to bin together the feedback received from the plurality of UEs. The encoding device may employ feedback binning to bin together the feedback from UEs that are located relatively close to each other (e.g., within a defined range from each other). The encoding device may employ the feedback binning to reduce a quantity of resources used for transmitting the feedback. In this example, feedback from the first UE and the second UE may be binned together and may be associated with a single PSFCH resource, based at least in part on the first UE and the second UE being located within a defined distance from each other. Feedback from the third UE and the fourth UE may be binned together and may be associated with a single PSFCH resource, based at least in part on the third UE and the fourth UE being located within a defined distance from each other. Within a same bin and with respect to a same packet, the encoding device may assume a NACK for all of the UEs in that bin with respect to that packet when at least one NACK is received. For example, when the feedback for the first UE and the second packet is a NACK and the feedback for the second UE and the second packet is an ACK, the encoding device may assume that both the second packet for the first UE and the second packet for the second UE are NACKs. As another example, when no feedback is received for the fourth packet for the first UE and the feedback for the second UE and the fourth packet is a NACK, the encoding device may assume that both the fourth packet for the first UE and the fourth packet for the second UE are NACKs. As yet another example, when no feedback is received for the third packet for the fourth UE and the feedback for the third packet and the third UE is an ACK, the encoding device may assume that both the third packet for the third UE and the third packet for the fourth UE are ACKs.

As shown by reference number 606, when the encoding device forms a network coding packet by combining packets, the first UE, the third UE, and the fourth UE may be able to decode a previously undecoded packet. For example, when the encoding device forms a network coding packet by combining $P_0$ and $P_2$, or $P_0$ and $P_3$, all four UEs may be able to decode a previously undecoded packet. In this case, transmitting the network coding packet using the feedback bins may enable the four UEs to decode a previously undecoded packet. Alternatively, when the encoding device forms a network coding packet by combining $P_0$ and $P_1$, or $P_1$ and $P_2$, or $P_1$ and $P_3$, only two UEs may decode a previously undecoded packet. When the encoding device forms a network combing packet by combining $P_2$ and $P_3$, no UEs may decode a previously undecoded packet. In some aspects, due to the feedback bins, the encoding device may determine to form the network coding packet by combining $P_0$ and $P_2$, or $P_0$ and $P_3$, which may maximize a quantity of NACK-to-ACK flips.

As indicated above, FIG. 6 is provided as an example. Other examples may differ from what is described with regard to FIG. 6.

Figure 7:
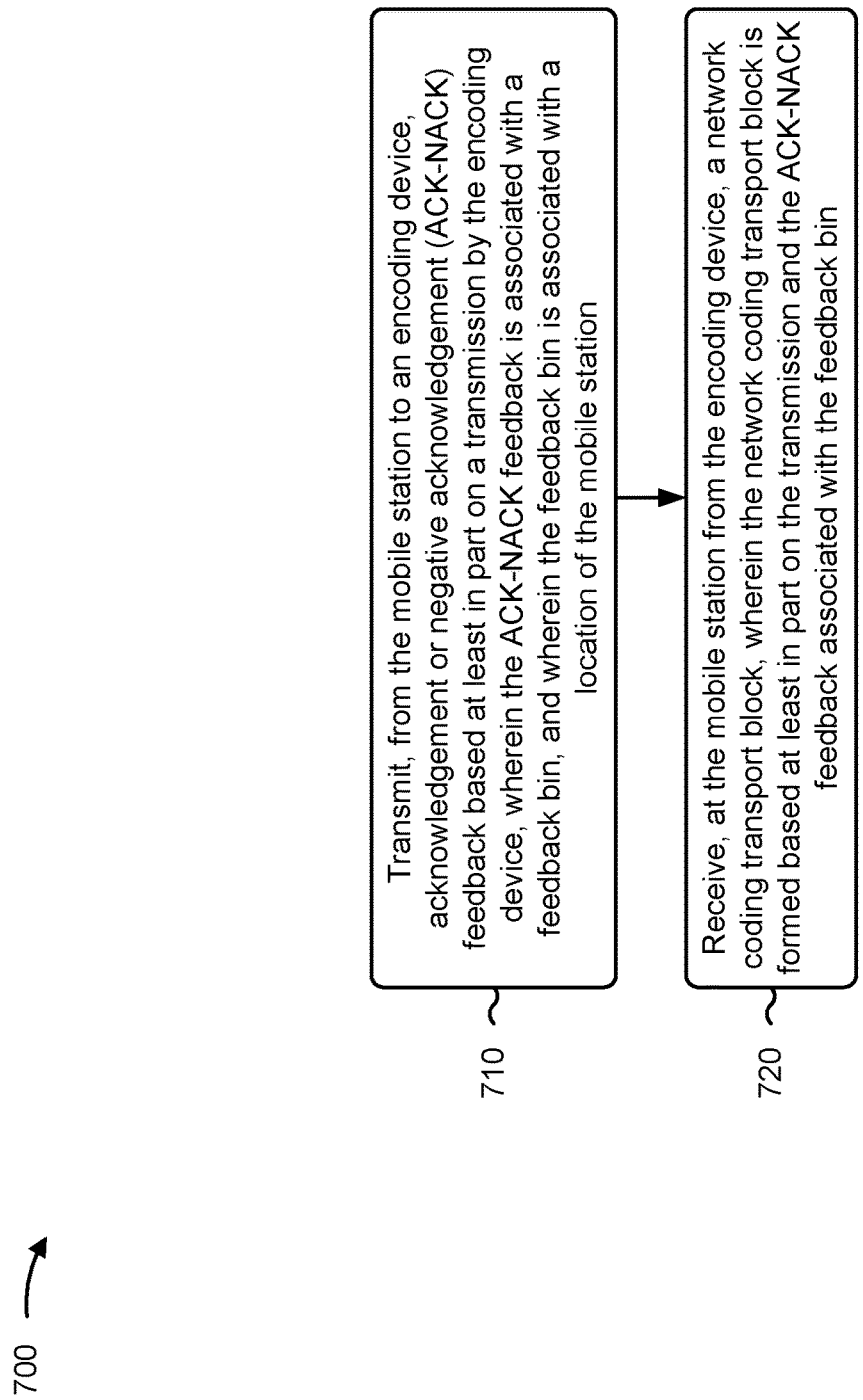
FIGS. 7-8 are diagrams illustrating example processes associated with network coding using feedback associated with feedback bins, in accordance with the present disclosure.

FIG. 7 is a diagram illustrating an example process 700 performed, for example, by a mobile station, in accordance with the present disclosure. Example process 700 is an example where the mobile station (e.g., UE 120) performs operations associated with network coding using feedback associated with feedback bins.

As shown in FIG. 7, in some aspects, process 700 may include transmitting, from the mobile station to an encoding device, ACK-NACK feedback based at least in part on a transmission by the encoding device, wherein the ACK-NACK feedback is associated with a feedback bin, and wherein the feedback bin is associated with a location of the mobile station (block 710). For example, the mobile station (e.g., using communication manager 140 and/or transmission component 904, depicted in FIG. 9) may transmit, from the mobile station to an encoding device, ACK-NACK feedback based at least in part on a transmission by the encoding device, wherein the ACK-NACK feedback is associated with a feedback bin, and wherein the feedback bin is associated with a location of the mobile station, as described above.

As further shown in FIG. 7, in some aspects, process 700 may include receiving, at the mobile station from the encoding device, a network coding transport block, wherein the network coding transport block is formed based at least in part on the transmission and the ACK-NACK feedback associated with the feedback bin (block 720). For example, the mobile station (e.g., using communication manager 140 and/or reception component 902, depicted in FIG. 9) may receive, at the mobile station from the encoding device, a network coding transport block, wherein the network coding transport block is formed based at least in part on the transmission and the ACK-NACK feedback associated with the feedback bin, as described above.

Process 700 may include additional aspects, such as any single aspect or any combination of aspects described below and/or in connection with one or more other processes described elsewhere herein.

In a first aspect, the mobile station is included in a plurality of mobile stations that are physically located within a defined distance from each other, and are categorized into the feedback bin.

In a second aspect, alone or in combination with the first aspect, process 700 includes transmitting the ACK-NACK feedback using a PSFCH resource associated with the feedback bin, wherein the PSFCH resource is shared by a plurality of mobile stations associated with the feedback bin, and the PSFCH resource is associated with a resource block location and a PSFCH sequence cyclic shift.

In a third aspect, alone or in combination with one or more of the first and second aspects, process 700 includes receiving, from the encoding device, an indication of the PSFCH resource for transmitting the ACK-NACK feedback.

In a fourth aspect, alone or in combination with one or more of the first through third aspects, an index associated with the PSFCH resource is based at least in part on a zone identifier associated with the mobile station, and the zone identifier is associated with the feedback bin.

In a fifth aspect, alone or in combination with one or more of the first through fourth aspects, process 700 includes receiving, from the encoding device, location information associated with the encoding device, and determining the feedback bin associated with the mobile station based at least in part on the location information associated with the encoding device.

In a sixth aspect, alone or in combination with one or more of the first through fifth aspects, the location information associated with the encoding device indicates a longitude and a latitude associated with the encoding device, and the location information associated with the encoding device is received from the encoding device via an SCI-2 in a network coding header, a MAC-CE, or an RRC message.

In a seventh aspect, alone or in combination with one or more of the first through sixth aspects, process 700 includes receiving, from the encoding device, an indication of the feedback bin associated with the mobile station.

In an eighth aspect, alone or in combination with one or more of the first through seventh aspects, process 700 includes: determining a zone identifier associated with the mobile station based at least in part on one or more of a sidelink zone length indicated in a sidelink zone configuration, a geodesic distance in longitude between the location of the mobile station and a location associated with a set of geographical coordinates, a geodesic distance in latitude between the location of the mobile station and the location associated with the set of geographical coordinates, or a location of the mobile station; transmitting, to the encoding device, an indication of the zone identifier associated with the mobile station; and receiving, from the encoding device, an indication of the feedback bin associated with the mobile station, wherein the feedback bin associated with the mobile station is based at least in part on the zone identifier associated with the mobile station.

In a ninth aspect, alone or in combination with one or more of the first through eighth aspects, process 700 includes transmitting the indication of the zone identifier associated with the mobile station in a transport block header or using a MAC-CE.

In a tenth aspect, alone or in combination with one or more of the first through ninth aspects, process 700 includes receiving the indication of the feedback bin associated with the mobile station via a unicast message or a multicast message.

In an eleventh aspect, alone or in combination with one or more of the first through tenth aspects, the encoding device is a base station, a roadside unit, or another mobile station, and the encoding device is a network coding encoding device.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
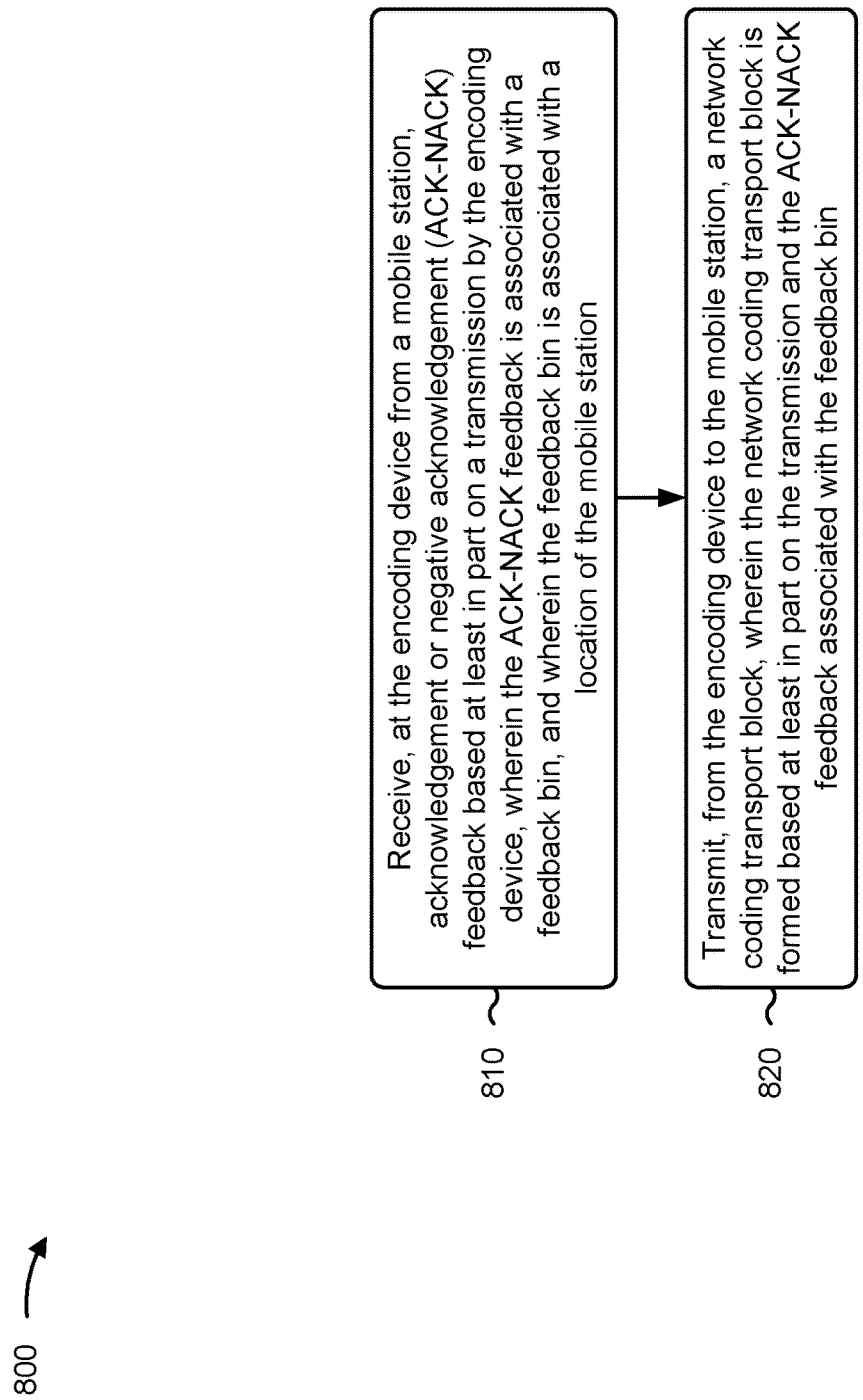

FIG. 8 is a diagram illustrating an example process 800 performed, for example, by an encoding device, in accordance with the present disclosure. Example process 800 is an example where the encoding device (e.g., base station 110) performs operations associated with network coding using feedback associated with feedback bins.

As shown in FIG. 8, in some aspects, process 800 may include receiving, at the encoding device from a mobile station, ACK-NACK feedback based at least in part on a transmission by the encoding device, wherein the ACK-NACK feedback is associated with a feedback bin, and wherein the feedback bin is associated with a location of the mobile station (block 810). For example, the encoding device (e.g., using communication manager 150 and/or reception component 1002, depicted in FIG. 10) may receive, at the encoding device from a mobile station, ACK-NACK feedback based at least in part on a transmission by the encoding device, wherein the ACK-NACK feedback is associated with a feedback bin, and the feedback bin is associated with a location of the mobile station, as described above.

As further shown in FIG. 8, in some aspects, process 800 may include transmitting, from the encoding device to the mobile station, a network coding transport block, wherein the network coding transport block is formed based at least in part on the transmission and the ACK-NACK feedback associated with the feedback bin (block 820). For example, the encoding device (e.g., using communication manager 150 and/or transmission component 1004, depicted in FIG. 10) may transmit, from the encoding device to the mobile station, a network coding transport block, wherein the network coding transport block is formed based at least in part on the transmission and the ACK-NACK feedback associated with the feedback bin, as described above.

Process 800 may include additional aspects, such as any single aspect or any combination of aspects described below and/or in connection with one or more other processes described elsewhere herein.

In a first aspect, the mobile station is included in a plurality of mobile stations that are physically located within a defined distance from each other, and are categorized into the feedback bin.

In a second aspect, alone or in combination with the first aspect, process 800 includes receiving the ACK-NACK feedback based at least in part on a PSFCH resource associated with the feedback bin, wherein the PSFCH resource is shared by a plurality of mobile stations associated with the feedback bin, and the PSFCH resource is associated with a resource block location and a PSFCH sequence cyclic shift.

In a third aspect, alone or in combination with one or more of the first and second aspects, process 800 includes transmitting, to the mobile station, an indication of the PSFCH resource for transmitting the ACK-NACK feedback.

In a fourth aspect, alone or in combination with one or more of the first through third aspects, an index associated with the PSFCH resource is based at least in part on a zone identifier associated with the mobile station, and the zone identifier is associated with the feedback bin.

In a fifth aspect, alone or in combination with one or more of the first through fourth aspects, process 800 includes transmitting, to the mobile station, location information associated with the encoding device, wherein the feedback bin associated with the mobile station is based at least in part on the location information associated with the encoding device.

In a sixth aspect, alone or in combination with one or more of the first through fifth aspects, the location information associated with the encoding device indicates a longitude and a latitude associated with the encoding device, and the location information associated with the encoding device is transmitted to the mobile station via an SCI-2 in a network coding header, a MAC-CE, or an RRC message.

In a seventh aspect, alone or in combination with one or more of the first through sixth aspects, process 800 includes determining the feedback bin associated with the mobile station, and transmitting, to the mobile station, an indication of the feedback bin associated with the mobile station.

In an eighth aspect, alone or in combination with one or more of the first through seventh aspects, process 800 includes: receiving, from the mobile station, an indication of a zone identifier associated with the mobile station, wherein the zone identifier associated with the mobile station is based at least in part on one or more of a sidelink zone length indicated in a sidelink zone configuration, a geodesic distance in longitude between the location of the mobile station and a location associated with a set of geographical coordinates, a geodesic distance in latitude between the location of the mobile station and the location associated with the set of geographical coordinates, or a location of the encoding device; and transmitting, to the mobile station, an indication of the feedback bin associated with the mobile station, wherein the feedback bin associated with the mobile station is based at least in part on the zone identifier associated with the mobile station.

In a ninth aspect, alone or in combination with one or more of the first through eighth aspects, process 800 includes receiving the indication of the zone identifier associated with the mobile station in a transport block header or using a MAC-CE.

In a tenth aspect, alone or in combination with one or more of the first through ninth aspects, process 800 includes transmitting the indication of the feedback bin associated with the mobile station via a unicast message or a multicast message.

In an eleventh aspect, alone or in combination with one or more of the first through tenth aspects, the encoding device is a base station, a roadside unit, or another mobile station, and wherein the encoding device is a network coding encoding device.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
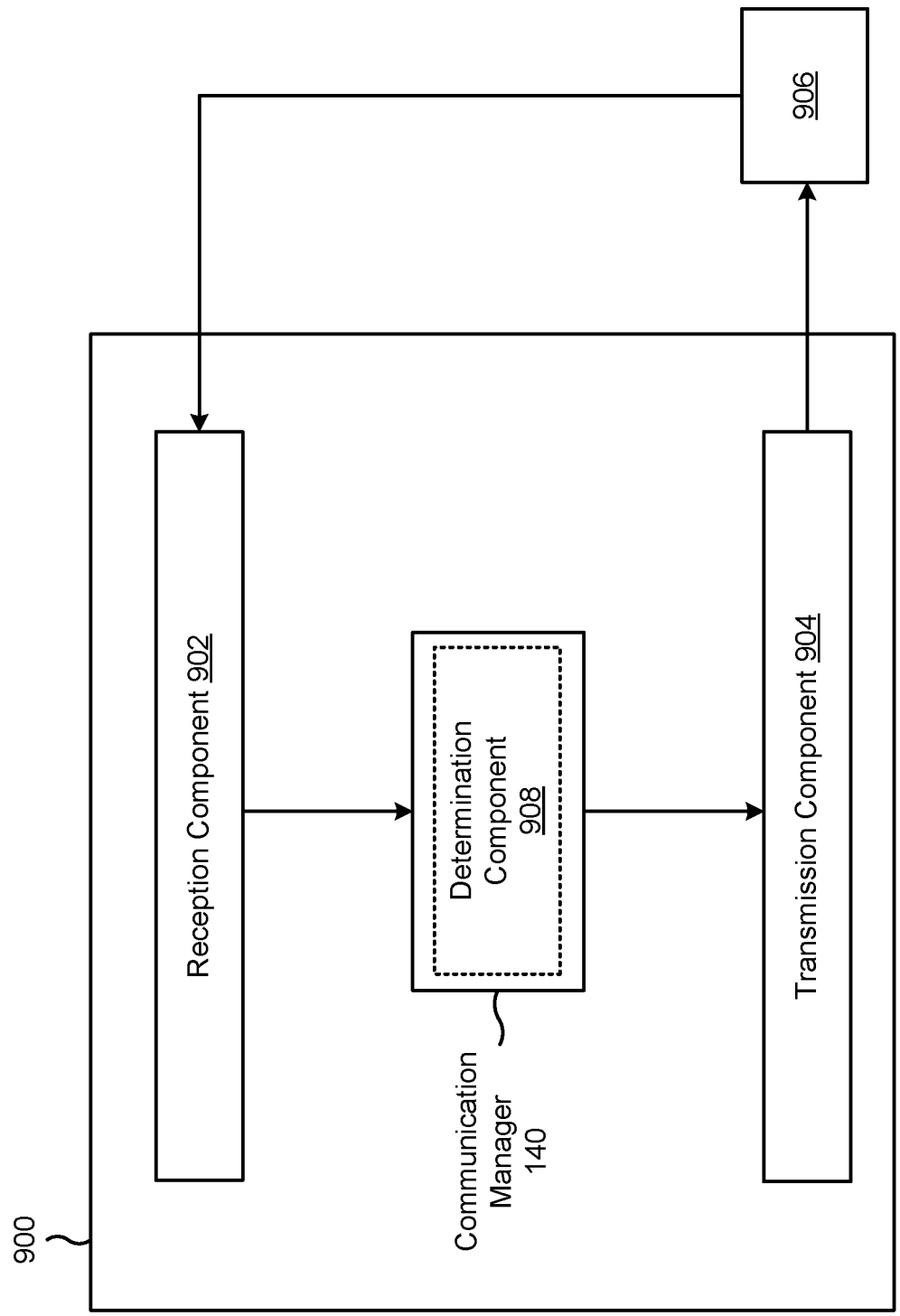
FIGS. 9-10 are diagrams of example apparatuses for wireless communication, in accordance with the present disclosure.

FIG. 9 is a diagram of an example apparatus 900 for wireless communication. The apparatus 900 may be a mobile station, or a mobile station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a determination component 908, among other examples.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the mobile station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the mobile station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the mobile station described in connection with FIG. 2. In some aspects, the transmission component 904 may be co-located with the reception component 902 in a transceiver.

The transmission component 904 may transmit, from the mobile station to an encoding device, ACK-NACK feedback based at least in part on a transmission by the encoding device, wherein the ACK-NACK feedback is associated with a feedback bin, and wherein the feedback bin is associated with a location of the mobile station. The reception component 902 may receive, at the mobile station from the encoding device, a network coding transport block, wherein the network coding transport block is formed based at least in part on the transmission and the ACK-NACK feedback associated with the feedback bin.

The transmission component 904 may transmit the ACK-NACK feedback using a PSFCH resource associated with the feedback bin, wherein the PSFCH resource is shared by a plurality of mobile stations associated with the feedback bin, and the PSFCH resource is associated with a resource block location and a PSFCH sequence cyclic shift. The reception component 902 may receive, from the encoding device, an indication of the PSFCH resource for transmitting the ACK-NACK feedback.

The reception component 902 may receive, from the encoding device, location information associated with the encoding device. The determination component 908 may determine the feedback bin associated with the mobile station based at least in part on the location information associated with the encoding device. The reception component 902 may receive, from the encoding device, an indication of the feedback bin associated with the mobile station.

The determination component 908 may determine a zone identifier associated with the mobile station based at least in part on one or more of: a sidelink zone length indicated in a sidelink zone configuration, a geodesic distance in longitude between the location of the mobile station and a location associated with a set of geographical coordinates, a geodesic distance in latitude between the location of the mobile station and the location associated with the set of geographical coordinates, or a location of the encoding device. The transmission component 904 may transmit, to the encoding device, an indication of the zone identifier associated with the mobile station. The reception component 902 may receive, from the encoding device, an indication of the feedback bin associated with the mobile station, wherein the feedback bin associated with the mobile station is based at least in part on the zone identifier associated with the mobile station.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
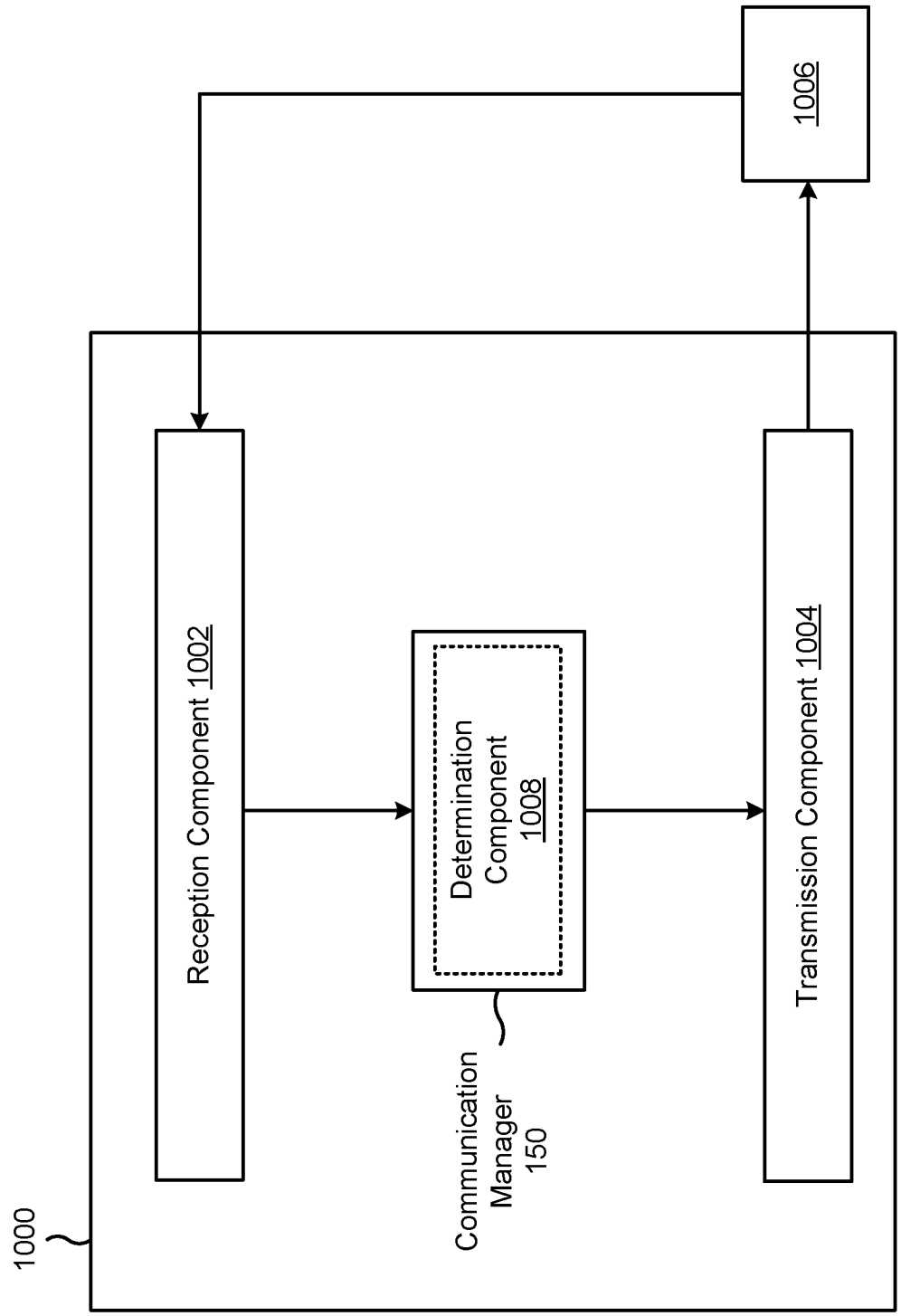

FIG. 10 is a diagram of an example apparatus 1000 for wireless communication. The apparatus 1000 may be a encoding device, or a encoding device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a determination component 1008, among other examples.

In some aspects, the apparatus 1000 may be configured to perform one or more operations described herein in connection with FIGS. 5-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the encoding device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the encoding device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the encoding device described in connection with FIG. 2. In some aspects, the transmission component 1004 may be co-located with the reception component 1002 in a transceiver.

The reception component 1002 may receive, at the encoding device from a mobile station, ACK-NACK feedback based at least in part on a transmission by the encoding device, wherein the ACK-NACK feedback is associated with a feedback bin, and wherein the feedback bin is associated with a location of the mobile station. The transmission component 1004 may transmit, from the encoding device to the mobile station, a network coding transport block, wherein the network coding transport block is formed based at least in part on the transmission and the ACK-NACK feedback associated with the feedback bin.

The reception component 1002 may receive the ACK-NACK feedback based at least in part on a PSFCH resource associated with the feedback bin, wherein the PSFCH resource is shared by a plurality of mobile stations associated with the feedback bin, and the PSFCH resource is associated with a resource block location and a PSFCH sequence cyclic shift. The transmission component 1004 may transmit, to the mobile station, an indication of the PSFCH resource for transmitting the ACK-NACK feedback.

The transmission component 1004 may transmit, to the mobile station, location information associated with the encoding device, wherein the feedback bin associated with the mobile station is based at least in part on the location information associated with the encoding device. The determination component 1008 may determine the feedback bin associated with the mobile station. The transmission component 1004 may transmit, to the mobile station, an indication of the feedback bin associated with the mobile station.

The reception component 1002 may receive, from the mobile station, an indication of a zone identifier associated with the mobile station, wherein the zone identifier associated with the mobile station is based at least in part on one or more of: a sidelink zone length indicated in a sidelink zone configuration, a geodesic distance in longitude between the location of the mobile station and a location associated with a set of geographical coordinates, a geodesic distance in latitude between the location of the mobile station and the location associated with the set of geographical coordinates, or a location of the encoding device. The transmission component 1004 may transmit, to the mobile station, an indication of the feedback bin associated with the mobile station, wherein the feedback bin associated with the mobile station is based at least in part on the zone identifier associated with the mobile station.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a mobile station, comprising: transmitting, from the mobile station to an encoding device, acknowledgement or negative acknowledgement (ACK-NACK) feedback based at least in part on a transmission by the encoding device, wherein the ACK-NACK feedback is associated with a feedback bin, and wherein the feedback bin is associated with a location of the mobile station; and receiving, at the mobile station from the encoding device, a network coding transport block, wherein the network coding transport block is formed based at least in part on the transmission and the ACK-NACK feedback associated with the feedback bin.

Aspect 2: The method of Aspect 1, wherein the mobile station is included in a plurality of mobile stations that are physically located within a defined distance from each other, and are categorized into the feedback bin.

Aspect 3: The method of any of Aspects 1 through 2, wherein transmitting the ACK-NACK feedback comprises transmitting the ACK-NACK feedback using a physical sidelink feedback channel (PSFCH) resource associated with the feedback bin, wherein the PSFCH resource is shared by a plurality of mobile stations associated with the feedback bin, and wherein the PSFCH resource is associated with a resource block location and a PSFCH sequence cyclic shift.

Aspect 4: The method of Aspect 3, further comprising: receiving, from the encoding device, an indication of the PSFCH resource for transmitting the ACK-NACK feedback.

Aspect 5: The method of Aspect 3, wherein an index associated with the PSFCH resource is based at least in part on a zone identifier associated with the mobile station, and wherein the zone identifier is associated with the feedback bin.

Aspect 6: The method of any of Aspects 1 through 5, further comprising: receiving, from the encoding device, location information associated with the encoding device; and determining the feedback bin associated with the mobile station based at least in part on the location information associated with the encoding device.

Aspect 7: The method of Aspect 6, wherein the location information associated with the encoding device indicates a longitude and a latitude associated with the encoding device, and wherein the location information associated with the encoding device is received from the encoding device via a sidelink control information stage 2 in a network coding header, a medium access control control element, or a radio resource control message.

Aspect 8: The method of any of Aspects 1 through 7, further comprising: receiving, from the encoding device, an indication of the feedback bin associated with the mobile station.

Aspect 9: The method of any of Aspects 1 through 8, further comprising: determining a zone identifier associated with the mobile station based at least in part on one or more of: a sidelink zone length indicated in a sidelink zone configuration, a geodesic distance in longitude between the location of the mobile station and a location associated with a set of geographical coordinates, a geodesic distance in latitude between the location of the mobile station and the location associated with the set of geographical coordinates, or a location of the encoding device; transmitting, to the encoding device, an indication of the zone identifier associated with the mobile station; and receiving, from the encoding device, an indication of the feedback bin associated with the mobile station, wherein the feedback bin associated with the mobile station is based at least in part on the zone identifier associated with the mobile station.

Aspect 10: The method of Aspect 9, wherein transmitting the indication of the zone identifier associated with the mobile station comprises transmitting the indication of the zone identifier associated with the mobile station in a transport block header or using a medium access control control element.

Aspect 11: The method of Aspect 9, wherein receiving the indication of the feedback bin associated with the mobile station comprises receiving the indication of the feedback bin associated with the mobile station via a unicast message or a multicast message.

Aspect 12: The method of any of Aspects 1 through 11, wherein the encoding device is a base station, a roadside unit, or another mobile station, and wherein the encoding device is a network coding encoding device.

Aspect 13: A method of wireless communication performed by an encoding device, comprising: receiving, at the encoding device from a mobile station, acknowledgement or negative acknowledgement (ACK-NACK) feedback based at least in part on a transmission by the encoding device, wherein the ACK-NACK feedback is associated with a feedback bin, and wherein the feedback bin is associated with a location of the mobile station; and transmitting, from the encoding device to the mobile station, a network coding transport block, wherein the network coding transport block is formed based at least in part on the transmission and the ACK-NACK feedback associated with the feedback bin.

Aspect 14: The method of Aspect 13, wherein the mobile station is included in a plurality of mobile stations that are physically located within a defined distance from each other, and are categorized into the feedback bin.

Aspect 15: The method of any of Aspects 13 through 14, wherein receiving the ACK-NACK feedback comprises receiving the ACK-NACK feedback based at least in part on a physical sidelink feedback channel (PSFCH) resource associated with the feedback bin, wherein the PSFCH resource is shared by a plurality of mobile stations associated with the feedback bin, and wherein the PSFCH resource is associated with a resource block location and a PSFCH sequence cyclic shift.

Aspect 16: The method of Aspect 15, further comprising: transmitting, to the mobile station, an indication of the PSFCH resource for transmitting the ACK-NACK feedback.

Aspect 17: The method of Aspect 15, wherein an index associated with the PSFCH resource is based at least in part on a zone identifier associated with the mobile station, and wherein the zone identifier is associated with the feedback bin.

Aspect 18: The method of any of Aspects 13 through 17, further comprising: transmitting, to the mobile station, location information associated with the encoding device, wherein the feedback bin associated with the mobile station is based at least in part on the location information associated with the encoding device.

Aspect 19: The method of Aspect 18, wherein the location information associated with the encoding device indicates a longitude and a latitude associated with the encoding device, and wherein the location information associated with the encoding device is transmitted to the mobile station via a sidelink control information stage 2 in a network coding header, a medium access control control element, or a radio resource control message.

Aspect 20: The method of any of Aspects 13 through 19, further comprising: determining the feedback bin associated with the mobile station; and transmitting, to the mobile station, an indication of the feedback bin associated with the mobile station.

Aspect 21: The method of any of Aspects 13 through 20, further comprising: receiving, from the mobile station, an indication of a zone identifier associated with the mobile station, wherein the zone identifier associated with the mobile station is based at least in part on one or more of: a sidelink zone length indicated in a sidelink zone configuration, a geodesic distance in longitude between the location of the mobile station and a location associated with a set of geographical coordinates, a geodesic distance in latitude between the location of the mobile station and the location associated with the set of geographical coordinates, or a location of the encoding device; and transmitting, to the mobile station, an indication of the feedback bin associated with the mobile station, wherein the feedback bin associated with the mobile station is based at least in part on the zone identifier associated with the mobile station.

Aspect 22: The method of Aspect 21, wherein receiving the indication of the zone identifier associated with the mobile station comprises receiving the indication of the zone identifier associated with the mobile station in a transport block header or using a medium access control control element.

Aspect 23: The method of Aspect 21, wherein transmitting the indication of the feedback bin associated with the mobile station comprises transmitting the indication of the feedback bin associated with the mobile station via a unicast message or a multicast message.

Aspect 24: The method of any of Aspects 13 through 23, wherein the encoding device is a base station, a roadside unit, or another mobile station, and wherein the encoding device is a network coding encoding device.

Aspect 25: An apparatus for wireless communication at a device, comprising a processor; memory coupled with the processor; and instructions stored in the memory and executable by the processor to cause the apparatus to perform the method of one or more of Aspects 1-12.

Aspect 26: A device for wireless communication, comprising a memory and one or more processors coupled to the memory, the one or more processors configured to perform the method of one or more of Aspects 1-12.

Aspect 27: An apparatus for wireless communication, comprising at least one means for performing the method of one or more of Aspects 1-12.

Aspect 28: A non-transitory computer-readable medium storing code for wireless communication, the code comprising instructions executable by a processor to perform the method of one or more of Aspects 1-12.

Aspect 29: A non-transitory computer-readable medium storing a set of instructions for wireless communication, the set of instructions comprising one or more instructions that, when executed by one or more processors of a device, cause the device to perform the method of one or more of Aspects 1-12.

Aspect 30: An apparatus for wireless communication at a device, comprising a processor; memory coupled with the processor; and instructions stored in the memory and executable by the processor to cause the apparatus to perform the method of one or more of Aspects 13-24.

Aspect 31: A device for wireless communication, comprising a memory and one or more processors coupled to the memory, the one or more processors configured to perform the method of one or more of Aspects 13-24.

Aspect 32: An apparatus for wireless communication, comprising at least one means for performing the method of one or more of Aspects 13-24.

Aspect 33: A non-transitory computer-readable medium storing code for wireless communication, the code comprising instructions executable by a processor to perform the method of one or more of Aspects 13-24.

Aspect 34: A non-transitory computer-readable medium storing a set of instructions for wireless communication, the set of instructions comprising one or more instructions that, when executed by one or more processors of a device, cause the device to perform the method of one or more of Aspects 13-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a mobile station, comprising:
    one or more memories; and
    one or more processors, based at least in part on information stored in the one or more memories, configured to:
        transmit, to an encoding device, acknowledgement or negative acknowledgement (ACK-NACK) feedback based at least in part on a transmission by the encoding device,
        wherein the mobile station is included in a feedback bin that includes a plurality of mobile stations grouped together for feedback, and
        wherein an acknowledgement (ACK) received from one of the plurality of mobile stations of the feedback bin is changed to a negative acknowledgement (NACK) when at least one NACK is received for the feedback bin; and
        receive, from the encoding device, a network coding transport block that is formed based at least in part on ACK-NACK feedback associated with the plurality of mobile stations.

2. The apparatus of claim 1, wherein the plurality of mobile stations are categorized into the feedback bin based at least in part on the plurality of mobile stations being physically located within a defined distance from each other.

3. The apparatus of claim 1, wherein the one or more processors, to transmit the ACK-NACK feedback, are configured to transmit the ACK-NACK feedback using a physical sidelink feedback channel (PSFCH) resource associated with the feedback bin and shared by the plurality of mobile stations associated with the feedback bin, wherein the PSFCH resource is associated with a resource block location and a PSFCH sequence cyclic shift.

4. The apparatus of claim 3, wherein the one or more processors are further configured to:
    receive, from the encoding device, an indication of the PSFCH resource for transmitting the ACK-NACK feedback.

5. The apparatus of claim 3, wherein an index associated with the PSFCH resource is based at least in part on a zone identifier associated with the mobile station, and wherein the zone identifier is associated with the feedback bin.

6. The apparatus of claim 1, wherein the one or more processors are further configured to:
    receive, from the encoding device, location information associated with the encoding device; and
    determine the feedback bin associated with the mobile station based at least in part on the location information associated with the encoding device.

7. The apparatus of claim 6, wherein the location information associated with the encoding device indicates a longitude and a latitude associated with the encoding device, and wherein the location information associated with the encoding device is received from the encoding device via a sidelink control information stage 2 in a network coding header, a medium access control control element, or a radio resource control message.

8. The apparatus of claim 1, wherein the one or more processors are further configured to:
receive, from the encoding device, an indication of the feedback bin associated with the mobile station.

9. The apparatus of claim 1, wherein the one or more processors are further configured to:
determine a zone identifier associated with the mobile station based at least in part on one or more of: a sidelink zone length indicated in a sidelink zone configuration, a geodesic distance in longitude between a location of the mobile station and a location associated with a set of geographical coordinates, a geodesic distance in latitude between the location of the mobile station and the location associated with the set of geographical coordinates, or a location of the encoding device;
transmit, to the encoding device, an indication of the zone identifier associated with the mobile station; and
receive, from the encoding device, an indication of the feedback bin associated with the mobile station, wherein the feedback bin associated with the mobile station is based at least in part on the zone identifier associated with the mobile station.

10. The apparatus of claim 9, wherein the one or more processors are configured to transmit the indication of the zone identifier associated with the mobile station in a transport block header or using a medium access control control element.

11. The apparatus of claim 9, wherein the one or more processors, to receive the indication of the feedback bin associated with the mobile station, are configured to receive the indication of the feedback bin associated with the mobile station via a unicast message or a multicast message.

12. The apparatus of claim 1, wherein the encoding device is a base station, a roadside unit, or another mobile station, and wherein the encoding device is a network coding encoding device.

13. An apparatus for wireless communication at an encoding device, comprising:
one or more memories; and
one or more processors, based at least in part on information stored in the one or more memories, configured to:
receive, from a mobile station that is included in a feedback bin, acknowledgement or negative acknowledgement (ACK-NACK) feedback based at least in part on a transmission by the encoding device,
wherein the feedback bin includes a plurality of mobile stations grouped together for feedback, and
wherein an acknowledgement (ACK) received from one of the plurality of mobile stations of the feedback bin is changed to a negative acknowledgement (NACK) when at least one NACK is received for the feedback bin; and
transmit, to the mobile station, a network coding transport block that is formed based at least in part on ACK-NACK feedback associated with the plurality of mobile stations.

14. The apparatus of claim 13, wherein the plurality of mobile stations are categorized into the feedback bin based at least in part on the plurality of mobile stations being physically located within a defined distance from each other.

15. The apparatus of claim 13, wherein the one or more processors, to receive the ACK-NACK feedback, are configured to receive the ACK-NACK feedback based at least in part on a physical sidelink feedback channel (PSFCH) resource associated with the feedback bin and shared by the plurality of mobile stations associated with the feedback bin, wherein the PSFCH resource is associated with a resource block location and a PSFCH sequence cyclic shift.

16. The apparatus of claim 15, wherein the one or more processors are further configured to:
transmit, to the mobile station, an indication of the PSFCH resource for transmitting the ACK-NACK feedback.

17. The apparatus of claim 15, wherein an index associated with the PSFCH resource is based at least in part on a zone identifier associated with the mobile station, and wherein the zone identifier is associated with the feedback bin.

18. The apparatus of claim 13, wherein the one or more processors are further configured to:
transmit, to the mobile station, location information associated with the encoding device, wherein the feedback bin associated with the mobile station is based at least in part on the location information associated with the encoding device.

19. The apparatus of claim 18, wherein the location information associated with the encoding device indicates a longitude and a latitude associated with the encoding device, and wherein the location information associated with the encoding device is transmitted to the mobile station via a sidelink control information stage 2 in a network coding header, a medium access control control element, or a radio resource control message.

20. The apparatus of claim 13, wherein the one or more processors are further configured to:
determine the feedback bin associated with the mobile station; and
transmit, to the mobile station, an indication of the feedback bin associated with the mobile station.

21. The apparatus of claim 13, wherein the one or more processors are further configured to:
receive, from the mobile station, an indication of a zone identifier associated with the mobile station, wherein the zone identifier associated with the mobile station is based at least in part on one or more of: a sidelink zone length indicated in a sidelink zone configuration, a geodesic distance in longitude between a location of the mobile station and a location associated with a set of geographical coordinates, a geodesic distance in latitude between the location of the mobile station and the location associated with the set of geographical coordinates, or a location of the encoding device; and
transmit, to the mobile station, an indication of the feedback bin associated with the mobile station, wherein the feedback bin associated with the mobile station is based at least in part on the zone identifier associated with the mobile station.

22. The apparatus of claim 21, wherein the one or more processors are configured to receive the indication of the zone identifier associated with the mobile station in a transport block header or using a medium access control control element.

23. The apparatus of claim 21, wherein the one or more processors, to transmit the indication of the feedback bin associated with the mobile station, are configured to transmit the indication of the feedback bin associated with the mobile station via a unicast message or a multicast message.

24. The apparatus of claim 13, wherein the encoding device is a base station, a roadside unit, or another mobile station, and wherein the encoding device is a network coding encoding device.

25. A method of wireless communication performed by a mobile station, comprising:
  transmitting, from the mobile station to an encoding device, acknowledgement or negative acknowledgement (ACK-NACK) feedback based at least in part on a transmission by an encoding device,
  wherein the mobile station is included in a feedback bin that includes a plurality of mobile stations grouped together for feedback, and
  wherein an acknowledgement (ACK) received from one of the plurality of mobile stations of the feedback bin is changed to a negative acknowledgement (NACK) when at least one NACK is received for the feedback bin; and
  receiving, at the mobile station from the encoding device, a network coding transport block that is formed based at least in part on ACK-NACK feedback associated with the plurality of mobile stations.

26. The method of claim 25, further comprising:
  receiving, from the encoding device, location information associated with the encoding device, wherein the location information associated with the encoding device indicates a longitude and a latitude associated with the encoding device, and wherein the location information associated with the encoding device is received from the encoding device via a sidelink control information stage 2 in a network coding header, a medium access control control element, or a radio resource control message; and
  determining the feedback bin associated with the mobile station based at least in part on the location information associated with the encoding device.

27. The method of claim 25, further comprising:
  determining a zone identifier associated with the mobile station based at least in part on one or more of: a sidelink zone length indicated in a sidelink zone configuration, a geodesic distance in longitude between a location of the mobile station and a location associated with a set of geographical coordinates, a geodesic distance in latitude between the location of the mobile station and the location associated with the set of geographical coordinates, or a location of the encoding device;
  transmitting, to the encoding device, an indication of the zone identifier associated with the mobile station; and
  receiving, from the encoding device, an indication of the feedback bin associated with the mobile station, wherein the feedback bin associated with the mobile station is based at least in part on the zone identifier associated with the mobile station.

28. A method of wireless communication performed by an encoding device, comprising:
  receiving, at the encoding device from a mobile station that is included in a feedback bin, acknowledgement or negative acknowledgement (ACK-NACK) feedback based at least in part on a transmission by the encoding device,
  wherein the feedback bin includes a plurality of mobile stations grouped together for feedback, and
  wherein an acknowledgement (ACK) received from one of the plurality of mobile stations of the feedback bin is changed to a negative acknowledgement (NACK) when at least one NACK is received for the feedback bin; and
  transmitting, from the encoding device to the mobile station, a network coding transport block that is formed based at least in part on ACK-NACK feedback associated with the plurality of mobile stations.

29. The method of claim 28, further comprising:
  transmitting, to the mobile station, location information associated with the encoding device, wherein the feedback bin associated with the mobile station is based at least in part on the location information associated with the encoding device, wherein the location information associated with the encoding device indicates a longitude and a latitude associated with the encoding device, and wherein the location information associated with the encoding device is transmitted to the mobile station via a sidelink control information stage 2 in a network coding header, a medium access control control element, or a radio resource control message.

30. The method of claim 28, further comprising:
  receiving, from the mobile station, an indication of a zone identifier associated with the mobile station, wherein the zone identifier associated with the mobile station is based at least in part on one or more of: a sidelink zone length indicated in a sidelink zone configuration, a geodesic distance in longitude between a location of the mobile station and a location associated with a set of geographical coordinates, a geodesic distance in latitude between the location of the mobile station and the location associated with the set of geographical coordinates, or a location of the encoding device; and
  transmitting, to the mobile station, an indication of the feedback bin associated with the mobile station, wherein the feedback bin associated with the mobile station is based at least in part on the zone identifier associated with the mobile station.

* * * * *